(No Model.)

A. D. GEORGE.
POTATO PLANTER.

No. 512,370. Patented Jan. 9, 1894.

Witnesses
Chas H. Durand
J. K. Siggers

Inventor
Amos D. George,
By his Attorneys,
C. A. Snow & Co.

UNITED STATES PATENT OFFICE.

AMOS D. GEORGE, OF GIBBON, NEBRASKA.

POTATO-PLANTER.

SPECIFICATION forming part of Letters Patent No. 512,370, dated January 9, 1894.

Application filed October 12, 1893. Serial No. 487,969. (No model.)

*To all whom it may concern:*

Be it known that I, AMOS D. GEORGE, a citizen of the United States, residing at Gibbon, in the county of Buffalo and State of Nebraska, have invented a new and useful Potato-Planter, of which the following is a specification.

My invention relates to improvements in planters, the objects in view being to provide an attachment adapted to be applied to a corn planter for planting simultaneously two rows of potatoes, or, if desired, one row.

With these general objects in view the invention consists in certain features of construction hereinafter specified and particularly pointed out in the claims.

Figure 1:
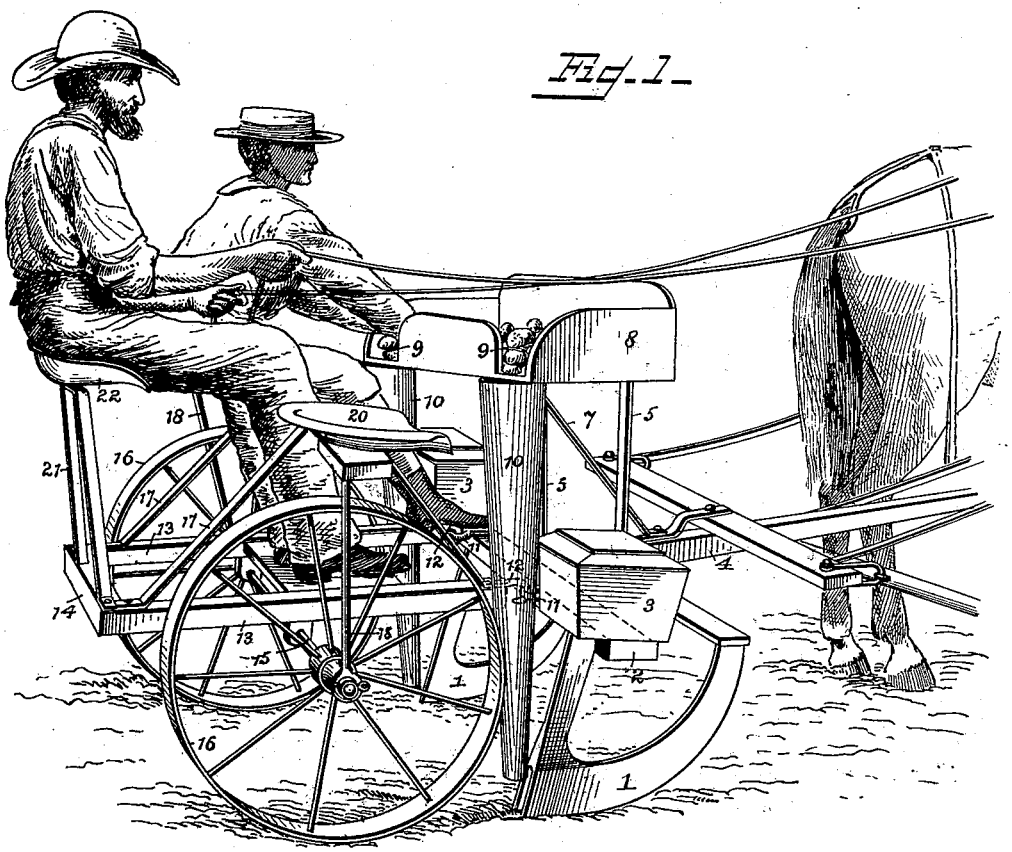
Figure 2:
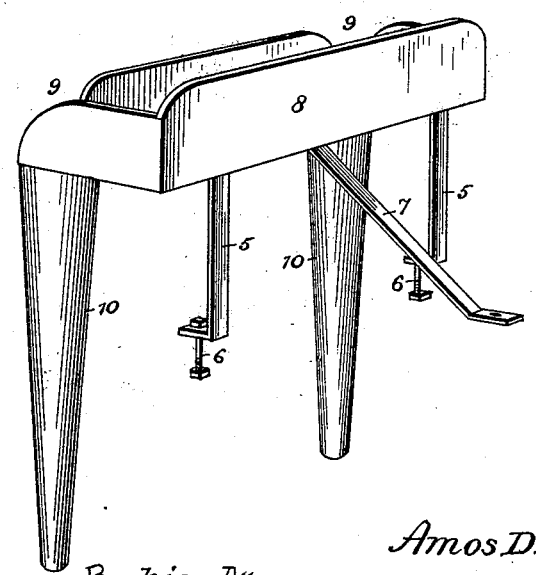

Referring to the drawings:—Figure 1 is a perspective view of a planter embodying my invention. Fig. 2 is a detail view of the attachment.

Like numerals of reference indicate like parts in both the figures of the drawings.

In practicing my invention I employ any ordinary planter of the class having runners, and as shown, the same as usual consists in the runners 1, which form the drills or furrows, the cross-bars or platform 2, which supports the seed-boxes 3, and the draft-bar 4. Upon the platform 2 I secure in a removable manner a pair of vertical standards 5, by means of bolts 6, passing through the lower ends of the standards (which are bent to form feet) and the platform; and also secure to the said draft-pole an inclined brace 7, whose lower end is bent to form a securing-foot through which a bolt is passed into the aforesaid draft-pole. Arranged upon the upper ends of these standards 5 and 7 is a transversely disposed feed-box 8, the same having its rear wall cut away at its ends forming discharge openings 9. Secured to the under side of this feed-box under the openings 9, is a discharge-spout or tube 10 whose lower ends terminate in rear of the runners 1.

Eyes 11 are located upon the rear ends of the platforms, and to these eyes I attach in a removable manner hooks 12, which are located at the front ends of a pair of longitudinal frame-bars 13 which are connected at their rear ends by a transverse frame-bar 14. These frame-bars 13 are provided with a transverse axle 15 which extends beyond the frame-bars and accommodates a pair of ground-wheels 16, the ends of the axle also extending beyond the ground-wheel.

An inverted V-shaped standard 17 is located upon each of the frame-bars 13, and is bolted thereto and to the shank of the hook 12. These standards are also connected at their upper ends to the upper bent end of a standard 18 by means of a bolt 19. The vertical portions of the standards 18 are beyond the ground-wheels and are perforated at their lower ends to receive the ends of the axle. The standards 17 and 18 are surmounted by seats 20 which are located, it will be seen, immediately in rear of the discharge-spouts 10. A third seat 22, is located upon the upper end of a vertical standard 21 which rises from and is bolted to the center of the transverse frame-bar 14.

In operation the driver is seated upon the rear central seat and a feeder (usually a boy) is seated upon each of the side seats. The seed-potatoes are placed in the feed-box 8 and are fed by hand by the feeders through the openings 9, into the discharge-spout 10, by which they are delivered in rear of the runners, as the furrow is formed so that, as will be obvious, whenever seed-potatoes are planted in drills two drills are simultaneously formed.

By the arrangement of the seats at the sides of the machine it will be seen that the weight of the feeders is distributed upon the axle directly over the wheels, and at the same time the feeders are in convenient position to rake the seed-potatoes from the feed-box into the upper ends of the feed-spouts.

It will be observed that my invention may be constructed as an attachment and applied to any ordinary seeder in use that is provided with furrow-opening devices.

The spouts 10 may be made wholly or partly of wire netting so that the feeder can see if the seed clogs in the tube.

It is to be understood that changes in the form, proportion, and the minor details of construction may be resorted to without departing from the spirit or sacrificing any of the advantages of this invention.

Having described my invention, what I claim is—

1. In combination with the framework of a planter, the herein described attachment consisting of a superimposed feed-box 8 having discharge openings, discharge-tubes arranged in rear of the openings, a framework loosely hinged to that of the planter, an intermediate seat supported on the framework, an axle, ground-wheels, and opposite side seats arranged on the rear framework in rear of the discharge-spouts and above the wheels, substantially as described.

2. In combination with a planter frame, the herein described attachment consisting of a superimposed feed-box 8 having openings at the opposite end of its rear wall, discharge-spouts arranged in rear of the openings, eyes at the rear end of the planter frame, opposite frame-bars, a transverse rear connecting frame-bar, metal plates arranged in opposite frame-bars and terminating beyond the same in hooks engaging the eyes, a transverse axle, ground-wheels for the same, a standard rising from the transverse bar and supporting a seat, opposite standards 17 arranged on the plates, standards 18 secured to the upper ends of the standards 17 and extending beyond and depending at the sides of the wheel and connected with the axle, and seats arranged thereon, substantially as specified.

3. In combination with a planter-frame, and standards rising therefrom, a feed-box 8 having its rear wall provided with openings supported by the standards, and depending discharge-tubes in rear of the openings, a framework pivoted to the planter-frame, a transverse axle, ground-wheels arranged on the axle, a seat supporting standard at the rear end of the framework, standards 17 arranged upon the side bars of the framework, outer standards 18 secured thereon and their lower ends connected to the axle and arranged at the intersection of the two standards, and seats 20 carried by the standards 17 and 18, substantially as specified.

4. An attachment to planters comprising a feed box 8 having discharge openings 9, seed-spouts 10 communicating with the latter, standards for detachably supporting the feed-box above the frame of the planter so as to cause the spouts to discharge in rear of the runners thereof, and seats 20 supported on the frame of the planter in rear of the openings 9 and directly above the ground-wheels of the planter for the purpose set forth.

In testimony that I claim the foregoing as my own I have hereto affixed my signature in the presence of two witnesses.

AMOS D. GEORGE.

Witnesses:
JAMES H. DAVIS,
FRANK HERSHEY.